Patented May 17, 1932

1,859,227

UNITED STATES PATENT OFFICE

PAUL G. WILLETTS, OF WEST HARTFORD, CONNECTICUT, ASSIGNOR TO HARTFORD-EMPIRE COMPANY, OF HARTFORD, CONNECTICUT, A CORPORATION OF DELAWARE

PROCESS OF MAKING GLASS TANK BLOCKS AND LIKE REFRACTORIES AND ARTICLE MADE THEREBY

No Drawing. Continuation of application Serial No. 345,614, filed March 8, 1929. This application filed February 21, 1930. Serial No. 430,459.

This application is a continuation of my copending application, Serial No. 345,614, filed March 8, 1929.

This invention relates to ceramic refractories for contact with molten glass such as parts for glass feeders, implements for use in molten glass, and particularly tank blocks for glass furnaces.

One of the objects of this invention, which also is an object of the invention in the aforesaid application, is to provide a novel ceramic refractory of the above character possessing such composition and properties that it will have a longer life in service than similar refractories heretofore produced, and to this end the ingredients for the articles to be made are so selected and processed as to produce a final product which has such novel properties as: unusually low flux content, whereby high resistance to the chemical attack of molten glass is obtained; a fine-grained structure of homogeneous character; and such chemical composition as not to materially affect the index of refraction, or to otherwise distort, the molten glass in contact therewith.

Experiments and tests, some of which are hereinafter described, clearly demonstrate that the novel refractories produced according to the aforesaid and the present inventions are vastly superior to those previously produced. This is attributed to the foregoing novel properties of these materials, as well as other novel properties such as impermeability, impenetrability, dense structure, a proper and uniform distribution of the few small pores in the material, and the complete transformation of the starting materials into small uniform crystals of aluminum silicate (mullite), uniformly distributed through a glassy matrix of exceptional viscosity and composition.

Refractories embodying the invention of my prior application possess the previously described and other novel properties to marked degrees. In accordance with my discoveries, set forth in my prior application, that the life and performance of glass contact refractories is largely dependent upon such properties as: low and uniformly distributed porosity, which controls permeability and/or penetrability; the total content of iron, alkalic and alkaline fluxes; and the internal arrangement or petrography of the constituents as well as the viscosity and composition of the glassy matrix; my novel refractories have low porosity (below 8% and as low as 1.5% and 0%) the pores being very uniformly distributed; they contain only 1.5% or less of total iron, alkalic and alkaline fluxes; they consist mainly of minute mullite crystals of uniform size uniformly distributed through a glassy matrix consisting mainly of amorphous silica, and constituting a large part of the total mass. Consequently, they are highly resistant to glass attack, lasting 13 to 17 hours in the "standard life test" described below.

It is a further object of the present invention to provide novel refractories which satisfy the above criteria to an equal and perhaps even greater degree than the refractories of my prior application, and to provide novel batch mixtures and a novel process, by the employment of which said refractories may be produced with comparatively great facility, from raw materials which are abundant and cheap.

Although novel refractories, embodying the invention of my prior application, may be produced satisfactorily from the batch mixtures and by the process disclosed therein, the present invention affords a wider margin of control in producing finished objects of the desired character, size, and shape, for example, large-size tank blocks for glass furnaces.

I have discovered that in the firing of clay bodies, the period of mechanical dehydration is followed by successive overlapping periods of oxidation, and of chemical dehydration, in the latter of which the water, chemically combined with the clay substance (kaolinite, approximately $Al_2O_3.2SiO_2.2H_2O$) is driven off and the clay shrinks. The period of chemical dehydration in turn is followed by a period of vitrification which overlaps the latter portion of the dehydration period. Vitrification is followed by fusion, and the amounts of vitrification and fusion depend upon the firing temperature and time, and upon the quantity and character of the fluxing agents in the clay mixture. I also have determined that the temperatures at which these periods begin and end, and the range between such temperatures, vary widely with different clays and other refractory minerals.

These and other variations, I have found, are affected by such physical properties of the clays as plasticity, state of mechanical subdivision, intimacy of mechanical association, the amount of fluxes present, and the chemical state thereof.

The aforesaid periods of change in firing are accompanied by volume changes, and if such changes are not properly controlled, the finished objects will not have the desired shape or size, and/or will not possess the physical properties and petrographic structure which is wanted.

The volume changes in a clay body are especially serious at the higher temperatures because at those temperatures, vitrification and partial fusion enter into the transformation. I have come to the conclusion that the variable factors, mentioned above must be so interrelated that the vitrification and fusion will not prevent the escape of gases and vapors which are given off from the ingredients during the transformation thereof, otherwise the finished body may be too porous. Shrinkage will occur unevenly, unless a "critical condition" exists in the system.

Another object of this invention is to provide novel batch mixtures, and a novel process, whereby said "critical condition", and the hazards heretofore experienced in producing clay bodies ceramically, are greatly minimized. By the accomplishment of this and other objects, the chemical and physical properties of the ingredients of the body may be varied more widely, and a wider range of control is afforded, than has been possible heretofore in producing clay bodies of the type under consideration. At the same time, however, I am enabled to develop the desired physical properties and petrographic structure in the finished body.

A more specific object of this invention is to provide novel batch compositions and a novel process of the above character for making large-sized clay objects, such as tank blocks for glass furnaces. It is fairly difficult to control the ceramic processes of making so-called white wares, chemical wares, small crucibles and the like, but it is far more difficult to produce large-sized objects, such as tank blocks, because the previously discussed variable and relatively uncontrollable factors in firing, are greatly increased and aggravated in these large objects. They are, in fact greater in proportion to differences in size than is generally supposed.

It is a prominent characteristic of the products described herein, that the glassy matrix which binds together the minute refractory crystals is exceedingly viscous, but contains substantially no free silica. Therefore, the products normally are composed of two phases only, the crystalline phase and the glassy phase. This contributes to uniform volume changes under changes of temperature. It has been considered heretofore that products made by the heat treatment of clays and other mineral starting materials contain at least three phases, such as mullite, glass and cristobalite, and the presence of two phases only in materials of this class is believed to be novel with the system disclosed in this application and in my prior applications.

I consider that the production of a highly viscous matrix without the presence of free silica is largerly due to the use of starting materials which themselves contain but little silica in the free state, and have substantially all of the silica in combination as kaolinite.

Refractories made according to the present invention preferably are produced by dry pressing. One example of the mineral composition of the final assembly which may suitably be employed, is as follows:

|   | Per cent |
|---|---|
| Non-plastic kaolin | 62.5 |
| Plastic bond clay | 30 |
| Feldspar | 7.5 |

The non-plastic kaolin may be of the character of Georgia Klondike white kaolin, which is mined near McIntyre, Wilkinson County, Georgia, and which is a soft, white and non-plastic kaolin. The plastic bond clay may be of the character of Georgia $G_1$ clay, which is a plastic bauxitic clay and may be obtained from the Savannah Kaolin Co. at Gordon, Georgia. These clays are described in Bulletin 252 of the U. S. Bureau of Mines, pages 15, 41 and 42. Any well-known commercial feldspar may be employed, such as that obtained from a deposit at Bedford Hills, N. Y.

The Georgia Klondike kaolin tends to offset the shrinkage of the plastic bond clay, and performs the further function of adding to the silica content of the product and producing rigidity at high firing temperatures and under high temperature conditions in service. This kaolin alone does not become impermeable below 2800° F. and has only slight mechanical strength when raw. It has a very small firing shrinkage.

The $G_1$ bauxitic clay has a considerable degree of plasticity and performs the function in this mixture of still further adding to the silica content and producing rigidity under heat, but is primarily used to give the initial mixture sufficient temporary strength for molding and handling. The $G_1$ clay also contributes to the final mechanical strength of the product.

The feldspar likewise adds to the silica content of the mixture, but its primary purpose is to control the rate and range of vitrification and the viscosity of the glass formed during firing and the viscosity of the glass in the finished body. The feldspar has a high viscosity which retards its inter-action with the surrounding clay grains, and it has a wide temperature range of vitrification and hence widens the range of the vitrification of the mixture as a whole; it tends to prevent warpage or cracking during firing.

The composition of these three ingredients is indicated in the following table, which gives analyses of typical samples:

|  | Georgia Klondike white kaolin | Georgia G$_1$ clay | Bedford feldspar XX |
|---|---|---|---|
|  | Per cent | Per cent | Per cent |
| Al$_2$O$_3$ | 39.19 | 36.59 | 19.31 |
| SiO$_2$ | 45.24 | 44.75 | 66.28 |
| TiO$_2$ | 1.61 | 1.56 |  |
| Fe$_2$O$_3$ | 0.43 | 1.22 | 0.067 |
| CaO | Trace | 0.42 | 0.17 |
| MgO |  | 0.17 |  |
| Na$_2$O and K$_2$O | 0.06 | 0.10 | 13.97 |
| Loss on Ignition | 13.75 | 15.63 | 0.20 |
|  | 100.28 | 100.44 | 100.00 |

The process employed in fabricating the novel refractory material embodying the present invention is similar to that disclosed in my prior application, above identified, and involves the preparation of a grog and of a binding mixture, and the mixing of the grog and the binder in suitable proportions to form a final assembly which is dry pressed or suitably molded into the final shape desired.

*The preparation of the grog*

One example of a batch mixture which may suitably be employed for the grog in carrying out my invention is as follows:

| | Parts |
|---|---|
| Georgia Klondike kaolin | 62.5 |
| Georgia G$_1$ clay | 30 |
| Feldspar | 7.5 |

The three ingredients for the grog first are ground exceedingly fine, suitably fine enough to pass through a standard U. S. No. 325 screen.

To indicate the degree of fineness to which I prefer to sub-divide starting materials, it may be noted that the standard No. 325 screen referred to above is identified by the U. S. Bureau of Standards as having a sieve opening of .044 mm. (.0017"), a wire diameter of .036 mm. (.0014"), with a tolerance in average opening of plus or minus 8% a tolerance in wire diameter of minus 15 to plus 35%, and a tolerance in maximum opening of 90%. See Bureau of Standards Specifications for Sieves, U. S. Standard Sieve Series.

The ground kaolin, G$_1$ clay, and feldspar are mixed as thoroughly as possible in the presence of water, by blunging, pugging, or other approved methods, so as to produce intimate association of the ingredients. Since it is important that the iron content of the final product be kept as low as possible, it is desirable that the materials be ground in a rubber-lined mill and mixed in a porcelain-lined pug mill or other mixing apparatus having non-ferrous surfaces. The mixed material is formed into pieces suitable for handling, which then are dried and are calcined at a temperature sufficient to develop microscopic crystals, typically at about 2850° F.

The calcined grog material is broken down to such fineness as may be desired, suitably fine enough to pass through a standard U. S. No. 24 screen, although coarser or finer grog may be employed.

*Preparation of the binder*

The binding mixture may consist of the same batch composition as the grog, the proportions of the ingredients being preferably the same as in the grog mixture, although these proportions may be varied somewhat if desired. The Klondike kaolin and the G$_1$ clay are ground as before, to exceeding fineness, suitably to pass through a standard U. S. No. 325 screen, and the feldspar likewise may be ground to similar fineness, or may be used in the fine condition in which it is obtained commercially, both for the grog and for the binding mixture.

The ingredients are intimately mixed, as in the case of the grog material, and the mixing preferably is carried out by means of a pug mill or other mixing apparatus, having non-ferrous surfaces, in order to prevent contamination of the material with iron, which is readily abraded from iron mixing surfaces by the hard particles of the ingredients.

*Preparation and shaping of the final assembly*

The final assembly for the blocks or other objects preferably is made by mixing 65 parts of the grog with 35 parts of the binder. This mixture is formed into the blocks, or other shapes, preferably by dry pressing under a pressure of the order of 1 to 2 tons per square inch. The material, when pressed, should contain about 6% to 12% of water.

The blocks or other articles are then dried and fired to complete vitrification and partial or incipient fusion but without general fusion. They may, for example, be fired to a temperature of about 2850° F.

Dry pressing is preferably employed in making refractory products according to the present invention, because the materials, as assembled before firing, have little or no plasticity or mechanical strength, either wet or dry. Therefore, the blocks cannot be made by ordinary methods of soft mud molding, or stiff mud molding or by pugging and extrusion, unless the amount of plastic bond clay is increased to permit shaping by soft mud or stiff mud molding. This may be done if desired.

The pressure under which the final assembly is dry pressed is somewhat critical for best results with the above batch mixtures, but may be varied if desirable or necessary. It has been found, however, that with the final assembly prepared as above described, dry pressing under a pressure of two tons or less per square inch is sufficient to develop a material having comparatively high density and low porosity.

By utilizing the batch mixtures of the stated ingredients or similar ingredients in the process described above, it has been found to be possible easily to produce bodies of the desired structure, shape and size. Thus, glass tank blocks may readily be made according to this invention, which after firing will be of the exact size required, and will be square within permissible tolerances, especially when the shrinkage is regulated by one of the methods described and claimed in my Patents Nos. 1,626,260 and 1,626,261. Heretofore, it generally has been necessary to grind tank blocks to the required shape and size before and/or after firing, or to employ luting in laying up the blocks. Such procedures are uneconomical and are eliminated by employing these methods of shrinkage control.

As is the case with the products made according to the invention in my prior application, products made according to the present invention have a very low content of plastic clay substance, which distinguishes them from ordinary tank block products. In the materials described above, the only plastic ingredient is the Georgia $G_1$ clay which is used in a much smaller proportion than the proportion of plastic clay in ordinary refractories. Ordinary tank block batches contain as much as 40% or more of plastic clay.

The refractory product of the present invention is remarkably distinguished from prior refractories with respect to its low total content of iron, alkalic, and alkaline oxides or fluxes. The composition of a typical finished object prepared according to the example given above is indicated in the following table:

| | Per cent |
|---|---|
| $Al_2O_3$ | 43.90 |
| $SiO_2$ | 53.58 |
| $TiO_2$ | 1.75 |
| $Fe_2O_3$ | .76 |
| CaO | .00 |
| MgO | .00 |
| $Na_2O$ | .68 |
| Ignition loss | .01 |
| Total | 100.68 |

The ordinary tank block, which hereinafter is compared with a tank block made according to the present invention, has a total content of 2.75% of iron and alkali metal oxides, whereas the above-described product of the present invention has a total content of only 1.44% of iron, alkalic, and alkali metal oxides.

The products of the present invention are white in color or nearly so, are dense, and are of low porosity. The pores which are present are small, round, and enclosed by dense walls, and are uniformly distributed throughout the mass. They have a bulk specific gravity of as high as 2.448, true specific gravity 2.72, porosity by absorption of 8% to 0% (the weight of water absorbed into the open pores in terms of the dried weight) and an apparent porosity of less than 8% (the weight of the water absorbed in the open pores in terms of the exterior volume).

These products are further characterized by an internal structure consisting of crystals which are uniform in size and very minute, distributed uniformly in a matrix composed wholly of amorphous glassy material which is low in fluxes and contains no free silica. Their fusion point is above 3100° F.

As stated above, the refractories of the inventions of my prior application and of the present application also are characterized by the presence within them of two phases only, typically mullite crystals and glass. This indicates the complete conversion of the starting materials, no part of which is distinguishable in the final product. Other high temperature refractory products heretofore produced, particularly tank blocks, contain at least three phases, such as mullite, glass and quartz, mullite, glass and cristobalite, mullite, corundum and glass, etc.

Another distinguishing feature of refractories embodying my invention is the transformation which is effected between the grog and the binder. Although the particles of the grog are highly refractory, their nature is such that a sufficient degree of inter-action between the particles of the grog and those of the binder is permitted during firing to obtain the previously described structure consisting of inter-locking crystals surrounded by a viscous glass. This is not true of most of the refractories in the prior art, particularly those in which fused corundum or mullite is used for the body. In those and other refractories the particles of the body material are held mechanically by a binder of low mechanical strength, and low resistance, between which no inter-action has been effected. No such inter-action can possibly be obtained because the fusion points of such materials as fused corundum and mullite are considerably higher than the temperatures which can be obtained in the best commercial kilns during the firing of the objects composed thereof. Therefore, such refractories are only as strong as the binder and quickly disintegrate in contact with molten glass.

The fine-grained, dense and homogeneous structure, and the miscroscopically small and uniformly distributed crystals, are considered to be the result of the extremely fine subdivision and intimate mixture of the starting materials and the development of the crystals in situ at a firing temperature short of fusion. Under these circumstances the crystals cannot grow beyond microscopic size, as would happen if the ingredients were not finely subdivided, or if the mixed material were melted, as in the electrically fused mullite process. These and other characteristics of my novel refractories also may be attributed to the use of batch mixtures of the character of those set forth above in conjunction with the other features of the novel process.

I have determined, by actual test of the products of my invention in contact with molten glass of an ordinary soda-lime type, that the solution of the refractory material in the glass does not materially distort the index of refraction of the glass, as other glass engaging refractories will do, especially such as are highly aluminous and/or contain undesirable impurities. This avoids or reduces to a minimum the formation of cords and streaks in the glass, which result from the solution of other refractories, as well as preventing appreciable change in the index of refraction of the glass itself.

As stated above, I have discovered that the life of the refractories in contact with molten glass depends upon their density or low porosity and upon their content of iron and alkali metal oxides. I have determined the properties of these and other materials by actual service and also by means of a standard life test, which gives relative results closely comparable with results obained in actual service. This standard life test consists in placing a test piece, consisting of a ½ cm. cube in a molten bath of ordinary commercial soda-lime bottle glass contained in a platinum crucible, which is maintained in a furnace at a constant temperature, suitably 2800° F. The result of this test is expressed in the number of hours which elapse after the sample is placed in the molten glass and until the sample entirely disappears in solution.

The temperature of 2800° F. is selected for the life test, because it gives readily comparable results in moderate periods of time. The life of a given sample is cut in two if the test temperature is raised to 2850° F. and is increased five times if the test temperature is reduced to 2500° F., but is increased only slightly at 2750° F.

A sample taken from a good tank block of ordinary composition and manufacture will last about 4.4 hours in the standard life test, whereas a sample taken from a tank block produced according to one embodiment of the invention No. 901—D) in my prior application has a life of 13.2 hours in the same test, and a sample taken from a tank block or other object produced according to the present invention has a life of 14 hours in this test.

Thus, the refractory of the present invention has even a greater life than the No. 901—D refractory described and claimed in my aforesaid application.

The relation between the hours in life by the standard test of (1) the refractory described and claimed in my aforesaid application No. 901—D, (2) a refractory embodying the present invention, (3) ordinary good tank block material, and (4) a cast mullite material which has heretofore been the standard of maximum life in contact with molten glass, and certain physical and chemical properties of these materials, are set forth in the following table:

|  | Ordinary good tank block | Cast mullite block | No.901—D No. 1 (high silica) | New material |
|---|---|---|---|---|
| Comparative life | 1.0 | 2.59 | 3.0 | 3.95 |
| Life in hours, by standard test | 4.4 | 11.4 | 13.2 | 14.00 hrs. |
| Bulk specific gravity | 1.932 | 3.23 | 2.35 | 2.448 |
| True specific gravity | 2.683 | 3.347 | 2.556 | 2.72 |
| Porosity | 27.4% | 0.70% | 0.075% | 7.54% |
| $Fe_2O_3+CaO$ | 3.73% | 2.49 | 1.43% | 1.44% |
| $Fe_2O_3+Na_2O$ | 2.75% | 1.85 | 1.23% | 1.44% |
| $Al_2O_3:SiO_2$ ratio | 0.494 | 3.06 | 0.563 | .819 |

The performance of the refractory material embodying the present invention in the standard life test is remarkable, when it is considered that as much as 7.5% of feldspar is incorporated in the finished body. Feldspar has a strong fluxing action, though not as strong as some other fluxing materials, but in spite of this fact the refractory material of this invention offers extraordinary resistance to the attack of molten glass.

It also is noted that the bulk specific gravity of this novel material, 2.448, is greater than the specific gravity of ordinary commercial soda-lime glass, which has 2.4 bulk specific gravity. So high a bulk specific gravity in a refractory material of the character of that disclosed herein is believed to be novel in view of the relatively low alumina content. Consequently, refractory tank blocks made according to the present invention may be used to good advantage in practicing the invention disclosed in my Patent No. 1,605,885, and in positions where it is desired that such portions of the material as may be broken away from the body thereof will sink in the glass and will not form stones therein.

In addition to being highly resistant to glass attack, the refractory of the present invention is also highly resistant to spalling.

The proportions and composition of the starting materials, the pressures and firing temperatures employed, as well as other steps of the process, and the properties of the finished products, may be varied without departing from the scope of the present invention, as defined in the claims.

In general, it may be said that processes, batch compositions, and products falling within this invention may be made from a wide variety of clays and other silicious and aluminous materials, provided that the total iron, alkalic, and alkaline flux content does not exceed the prescribed minimum, and/or that their physical and chemical character is such as to permit the desired range of control in firing.

In some of the appended claims, the starting materials mentioned above are referred to specifically, but it will be understood that these designations include such other materials as resemble these particular substances in respect to their analytical composition and their physical properties and behavior when used in the process described herein, as well as mixtures of materials having the approximate analytical composition and properties of the specific materials and mixtures described above.

Having thus described my invention, what I desire to claim and to secure by Letters Patent is:

I claim:

1. The process of making glass tank blocks which comprises grinding non-plastic kaolin, plastic bond clay, and feldspar to impalpable fineness, mixing a relatively large amount of the non-plastic kaolin with a smaller amount of the plastic bond clay and with a still smaller amount of the feldspar, molding the mixture into blocks by drypressing, and firing the blocks so formed to complete vitrification and partial fusion, thereby completely transforming all of the said ingredients into crystals and glass.

2. The process of making glass tank blocks which comprises grinding non-plastic kaolin, plastic bond clay, and feldspar to impalpable fineness, mixing the kaolin, clay and feldspar in approximately the proportions of 62.5 parts by weight of the kaolin, 30 parts by weight of the clay, and 7½ parts of the feldspar, calcining the mixture thus formed for grog, grinding additional kaolin, clay and feldspar to impalpable fineness, preparing a binder by mixing approximately 62.5 parts by weight of the kaolin with 30 parts of the clay and 7.5 parts of the feldspar, mixing the grog with the binder in the proportions of approximately 65 parts of the grog to 35 parts of the binder, molding the mixture thus formed into tank blocks by dry pressing, and firing the blocks to complete vitrification and partial fusion, thereby transforming all of the said ingredients into crystals and glass.

3. The process of making glass tank blocks which comprises mixing non-plastic kaolin and plastic clay which are initially substantially free from iron, alkalic, and alkaline fluxes, adding a predetermined amount of fluxing material to the mixture, molding the mixture into blocks by dry-pressing, and firing the blocks to complete vitrification and partial fusion, thereby completely transforming all of the ingredients to crystals and glass.

4. The process of making ceramic refractory materials which comprises grinding non-plastic kaolin, plastic bond clay, and feldspar to impalpable fineness, mixing a relatively large amount of the non-plastic kaolin with a smaller amount of the plastic bond clay and a still smaller predetermined amount of the feldspar, molding the mixture into objects by dry-pressing, and firing the objects to complete vitrification and partial fusion, to completely transform all of the ingredients into minute crystals and a glassy matrix, the crystals being uniformly distributed through the glassy matrix.

5. The process of making ceramic refractory materials which comprises grinding non-plastic kaolin, plastic bond clay, and feldspar to impalpable fineness, mixing a relatively large amount of the non-plastic kaolin with a smaller amount of the plastic bond clay and a still smaller predetermined amount of the feldspar, molding the mixture into objects by dry-pressing, and firing the objects to complete vitrification and partial fusion, to completely transform all of the ingredients into minute crystals and a glassy matrix, the crystals being uniformly distributed through the glassy matrix and the glassy matrix being substantially free from free silica.

6. The process of making tank blocks which comprises mixing clay with not less than approximately 7.5% feldspar, firing the mixture to a temperature of approximately 2850° F., crushing the fired material for grog, mixing the grog with a binder of substantially the same mineral composition as used in preparing the grog, to provide a final assembly, the moisture content of said mixture being so regulated as to amount to at least 6%, pressing the mixture to form dense tank blocks, and firing the blocks to a temperature of approximately 2850° F.

7. The process of making glass contact refractories, which comprises grinding clay and feldspar to impalpable fineness, preparing a batch of the clay and feldspar containing at least 7.5% feldspar, intimately mixing the clay and feldspar in the presence of water, forming the mixture into pieces suitable for handling, calcining the pieces to a temperature of approximately 2850° F., crushing the calcined material to provide grog, mixing the grog with a binder composed of the same batch mixture of impalpable materials as used for the grog, to provide a final assembly, the moisture content of the final assembly being so regulated as to amount to at least 6%, pressing the final assembly to form dense objects, and firing the objects to a temperature of approximately 2850° F.

Signed at Hartford, Conn., this 20th day of February, 1930.

PAUL G. WILLETTS.